US012162517B2

(12) United States Patent
Xu et al.

(10) Patent No.: US 12,162,517 B2
(45) Date of Patent: Dec. 10, 2024

(54) AUTONOMOUS DRIVING PATTERN PROFILE

(71) Applicant: HERE Global B.V., Eindhoven (NL)

(72) Inventors: Jingwei Xu, Buffalo Grove, IL (US); Yuxin Guan, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 465 days.

(21) Appl. No.: 17/136,460

(22) Filed: Dec. 29, 2020

(65) Prior Publication Data
US 2022/0204043 A1  Jun. 30, 2022

(51) Int. Cl.
B60W 60/00 (2020.01)
B60W 50/14 (2020.01)
G01C 21/34 (2006.01)
G06N 20/00 (2019.01)

(52) U.S. Cl.
CPC ..... *B60W 60/0051* (2020.02); *G01C 21/3484* (2013.01); *G01C 21/3492* (2013.01); *G06N 20/00* (2019.01); *B60W 2050/146* (2013.01)

(58) Field of Classification Search
CPC ........ B60W 60/0051; B60W 2050/146; G01C 21/3484; G01C 21/3492; G06N 20/00
See application file for complete search history.

(56) References Cited

U.S. PATENT DOCUMENTS

| 10,539,962 B2 | 1/2020 | Sogen |
| 10,545,024 B1 | 1/2020 | Konrardy |
| 2017/0203770 A1 | 7/2017 | Kondo |
| 2020/0223453 A1* | 7/2020 | Le Chaffotec ........ B60W 30/16 |
| 2020/0233426 A1* | 7/2020 | Johnson ................ G05D 1/0061 |
| 2020/0250902 A1* | 8/2020 | Golov ................. B60R 21/0136 |
| 2021/0048529 A1* | 2/2021 | Roy Chowdhury ........................ B60W 40/068 |
| 2021/0221403 A1* | 7/2021 | Gyllenhammar .... G05D 1/0276 |
| 2021/0387650 A1* | 12/2021 | Li ....................... B60W 50/045 |

FOREIGN PATENT DOCUMENTS

| EP | 3677476 A1 | 7/2020 |
| WO | 2020147493 A1 | 7/2020 |

OTHER PUBLICATIONS

Dixit VV, Chand S, Nair DJ (Dec. 20, 2016). Autonomous Vehicles: Disengagements, Accidents and Reaction Times. PLoS One 11(12): e0168054. doi:10.1371/journal.pone.0168054 (pp. 1-14).

* cited by examiner

*Primary Examiner* — Anne Marie Antonucci
*Assistant Examiner* — Patrick Daniel Mohl
(74) *Attorney, Agent, or Firm* — Lempia Summerfield Katz LLC

(57) ABSTRACT

Systems and methods for determining a cause of a change in driver assistance capability may be based on probe data generated by a mobile device or vehicle. The probe data is matched to a path segment. A cause of the change in driver assistance capability for the path segment is determined based on the probe data matched to the path segment. A geographic database record including the cause of the change in the driver assistance capability is output.

18 Claims, 11 Drawing Sheets

AUTONOMOUS DRIVING PATTERN PROFILE

FIELD

Figure 1:
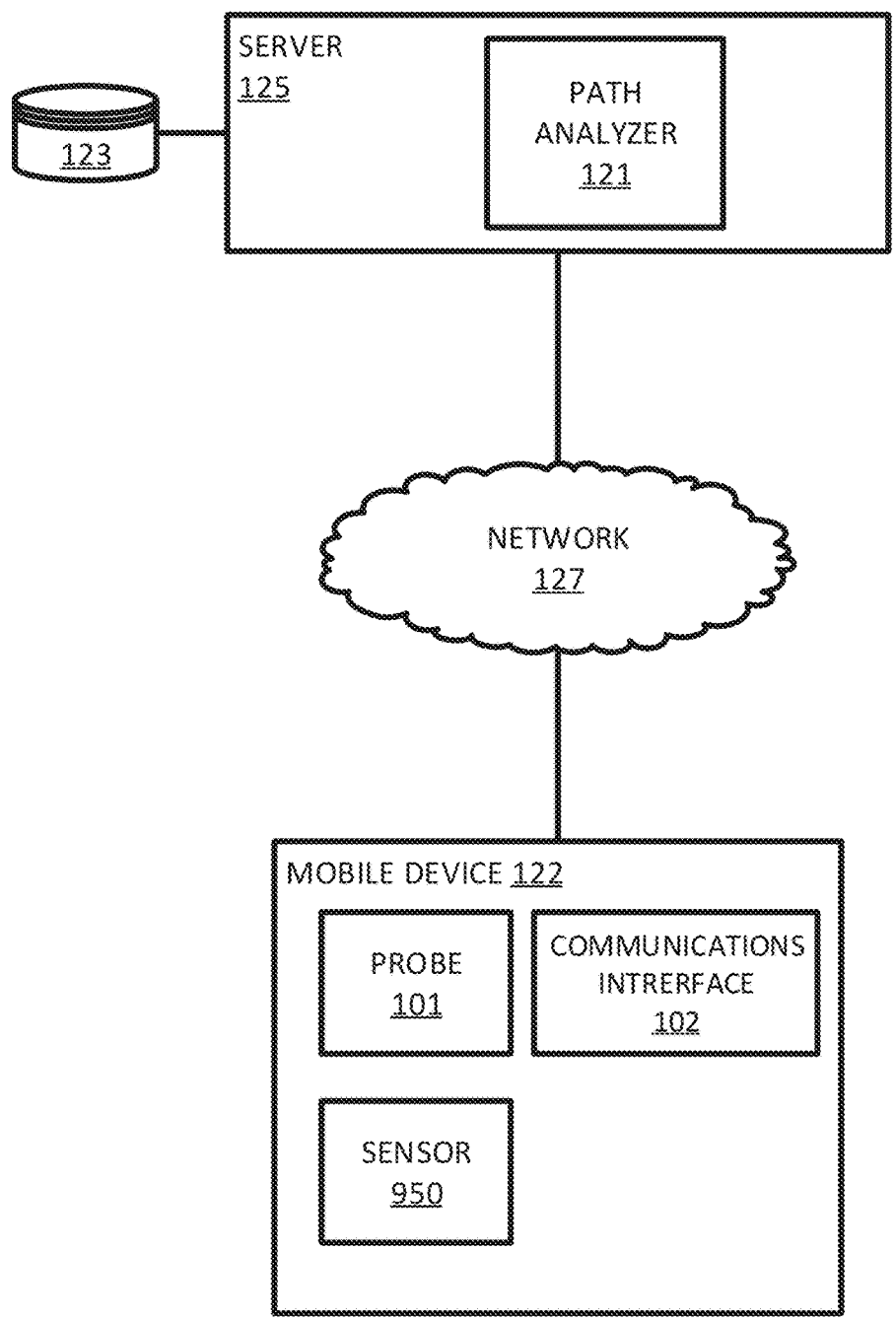

The following disclosure relates to determining a cause of a change in available driver assistance features.

BACKGROUND

Mobile devices, including vehicles, may use different sensor technologies and high definition (HD) MAP or dynamic backend content, including traffic information services, to aid an in-vehicle control system for the right decision strategy as how to drive along the road network. For example, the control system may decide to enable or disable a driver assistance feature or capability based on the sensors and content.

When driver assistance features or capabilities are enabled or disabled (e.g., a "switchover"), the behavior of the vehicle changes accordingly. For example, when a driver assistance feature is disabled, a driver may take control of the vehicle, or the vehicle may pull over or otherwise stop a trip. Changes in the available driver assistance features interrupt the driving experience and may decrease safety of the vehicle. For example, a driver may be unprepared to take control of the vehicle when a driver assistance feature is disabled. In another example, the driver may choose to not use an available driver assistance feature if the driver is concerned the drive assistance feature may be disabled in the future.

SUMMARY

In one embodiment, a method includes receiving probe data generated by a vehicle, the probe data including a change in a driver assistance capability of the vehicle, matching the probe data to a path segment, determining a cause of the change in the driver assistance capability for the path segment based on the probe data matched to the path segment, and outputting a geographic database record including the cause of the change in the driver assistance capability.

In one embodiment, a system includes a probe data aggregator configured to receive probe data from a plurality of vehicles, the probe data including a change in a driver assistance capability of the vehicle, a path analyzer configured to match the probe data to a path segment and determine a cause of the change in the driver assistance capability for the path segment based on the probe data matched to the path segment, and a database manager configured to output a geographic database record including the cause of the change in the driver assistance capability.

In one embodiment, a non-transitory computer-readable medium includes instructions that when executed are operable to aggregate probe data generated by a plurality of vehicles, the probe data including a change in a driver assistance capability of each vehicle of the plurality of vehicles, match the probe data to a path segment, determine a cause of the change in the driver assistance capability for the path segment based on the probe data matched to the path segment, and output a geographic database record including the cause of the change in the driver assistance capability.

BRIEF DESCRIPTIONS OF THE DRAWINGS

Exemplary embodiments of the present invention are described herein with reference to the following drawings.

Figure 2:
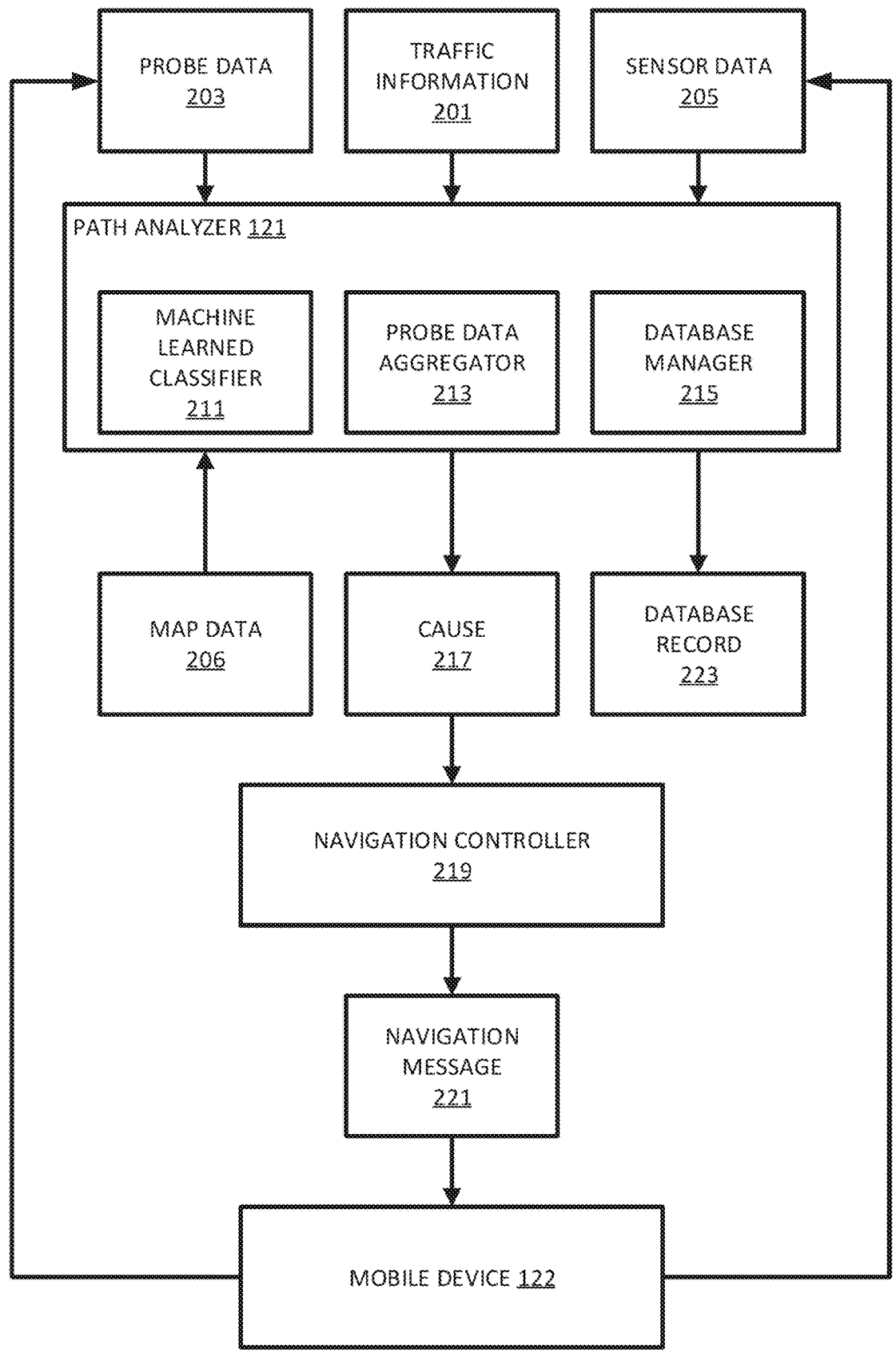
Figure 3:
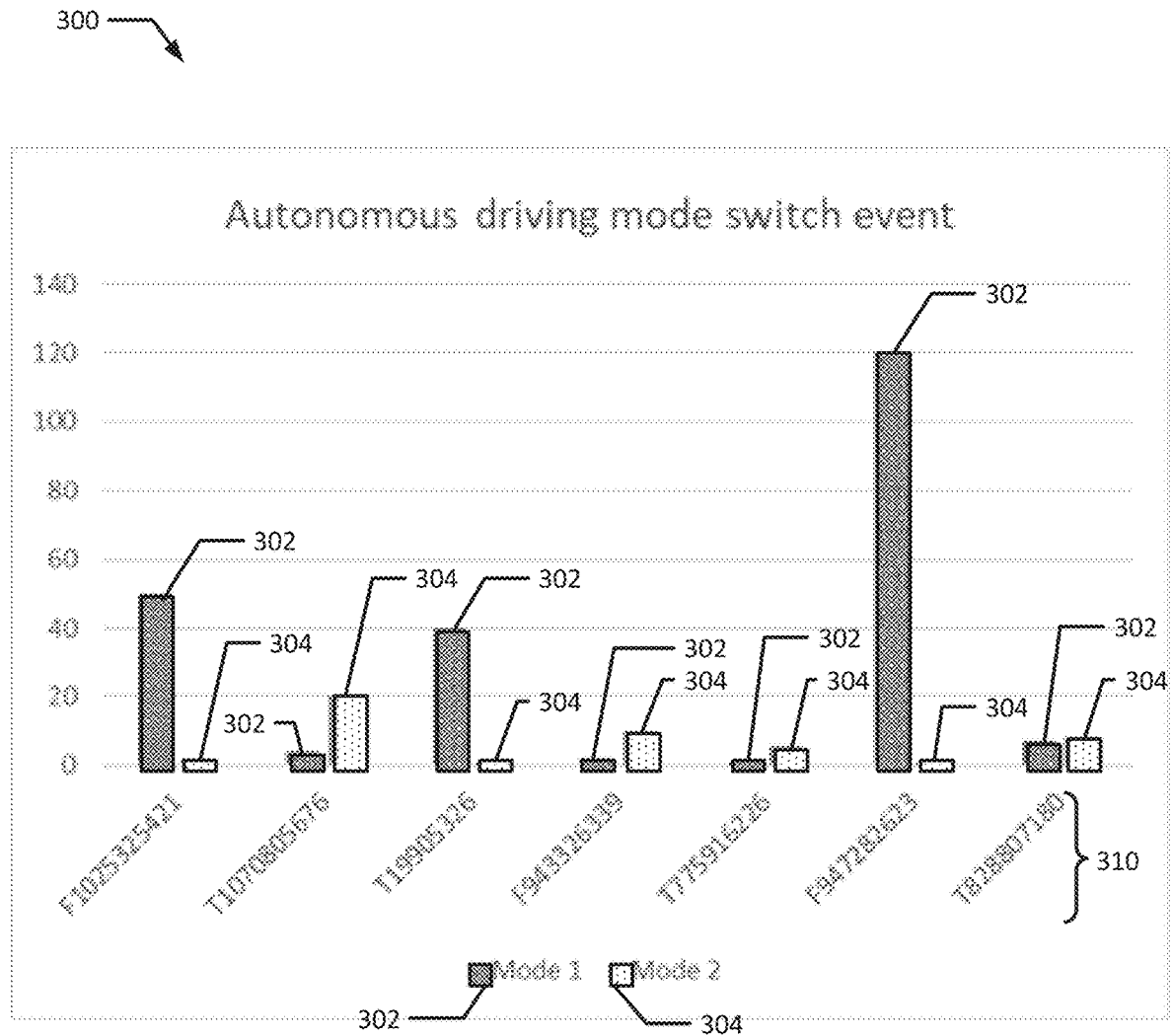
Figure 4:
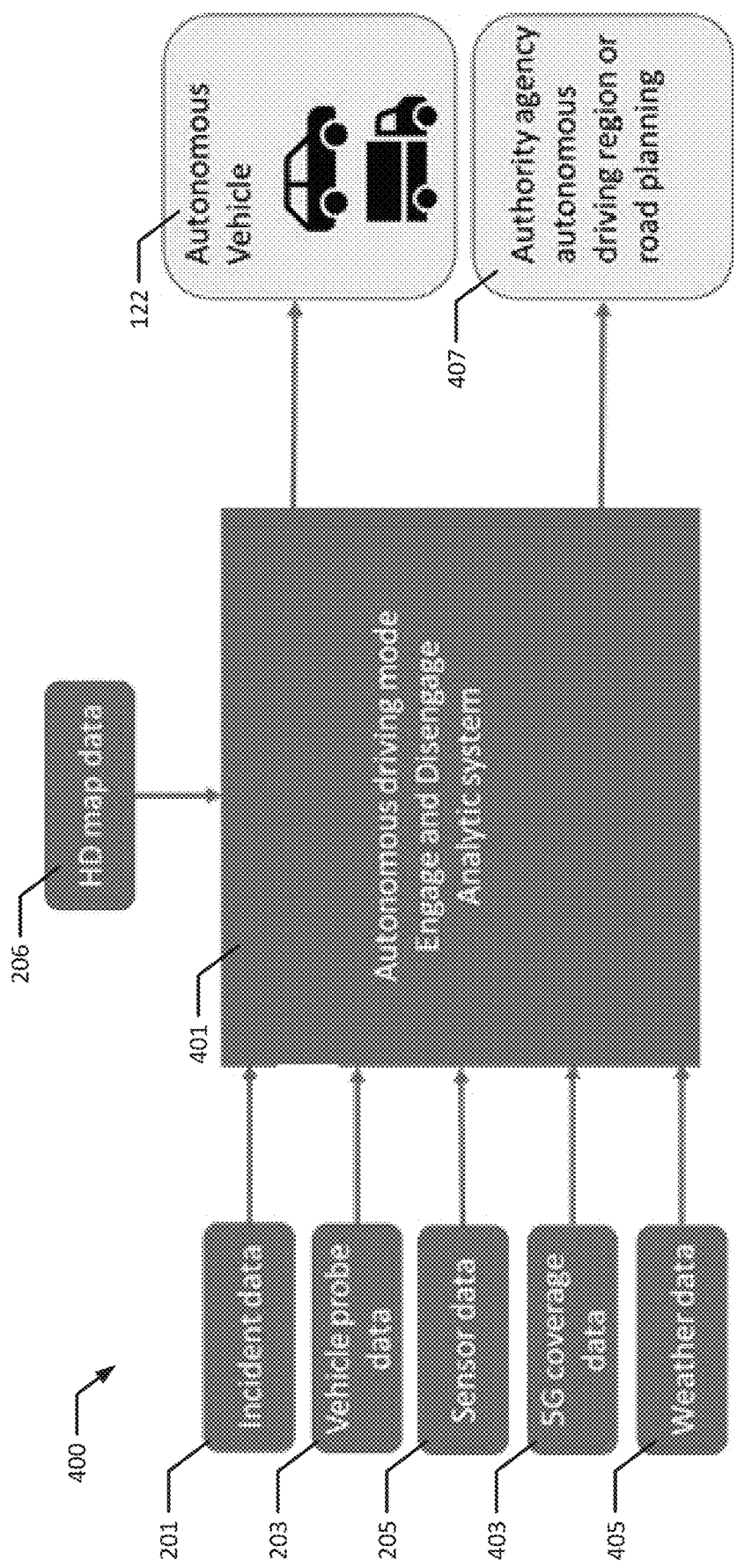
Figure 5:
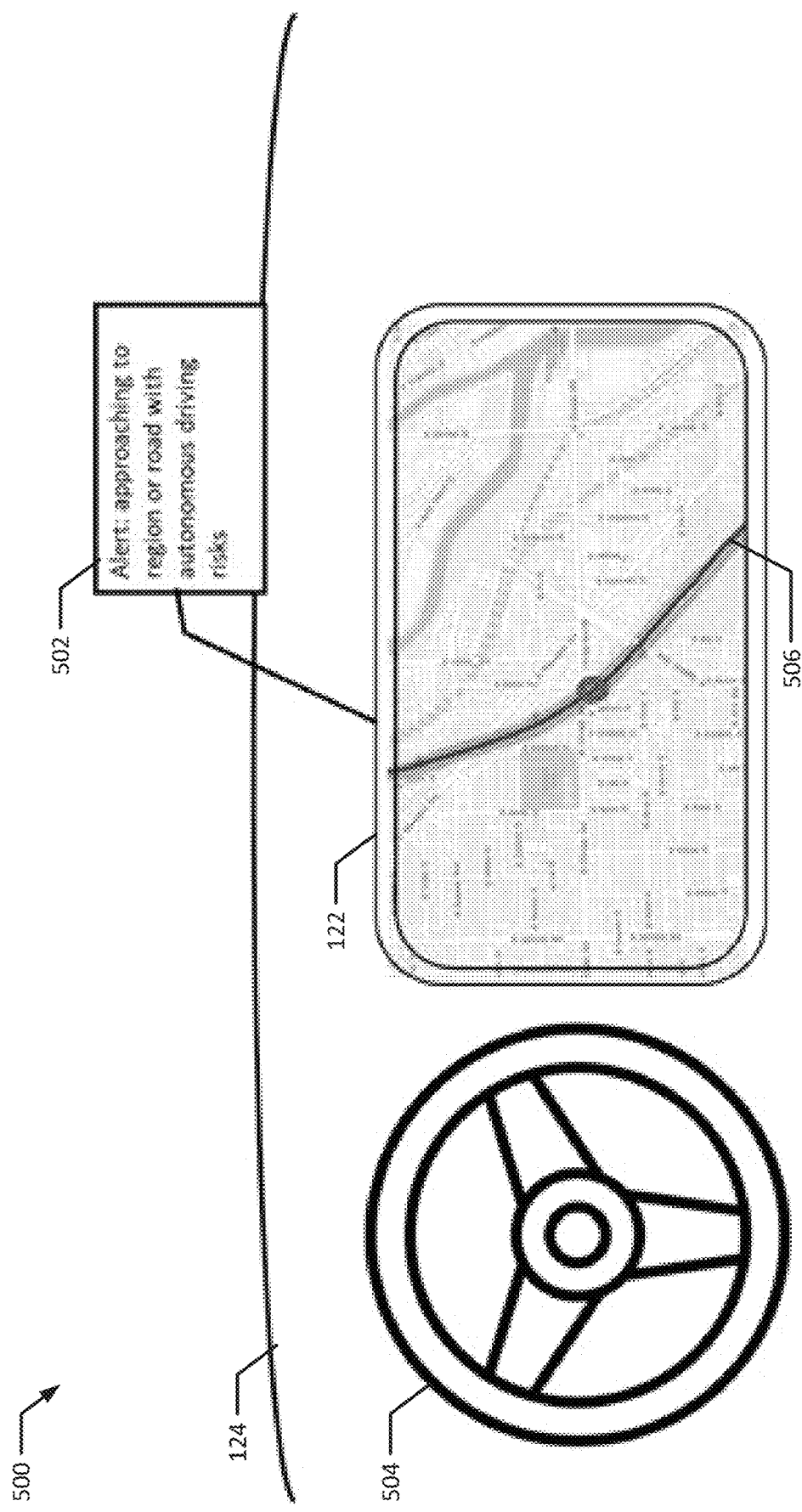
Figure 6:
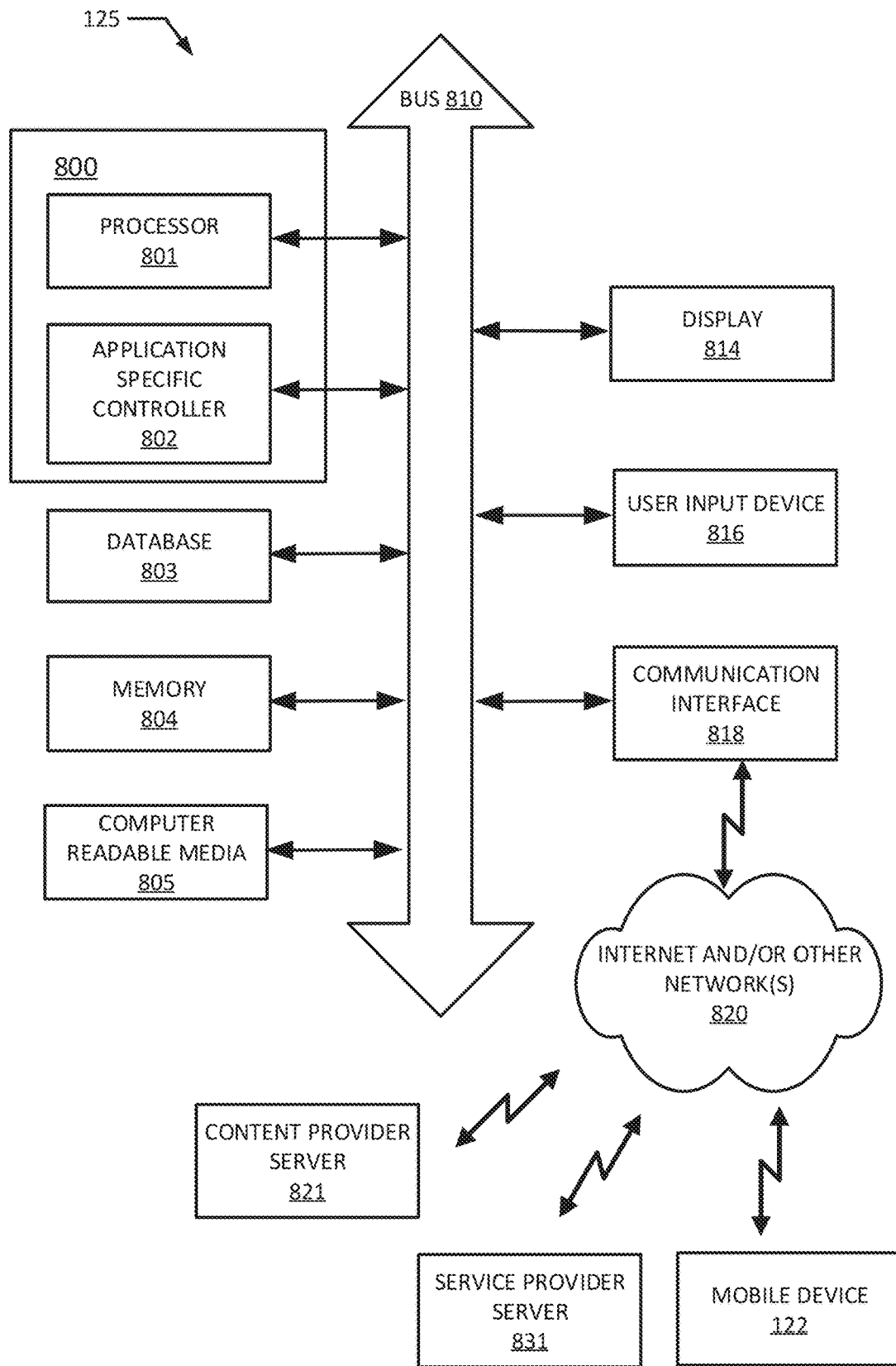
Figure 7:
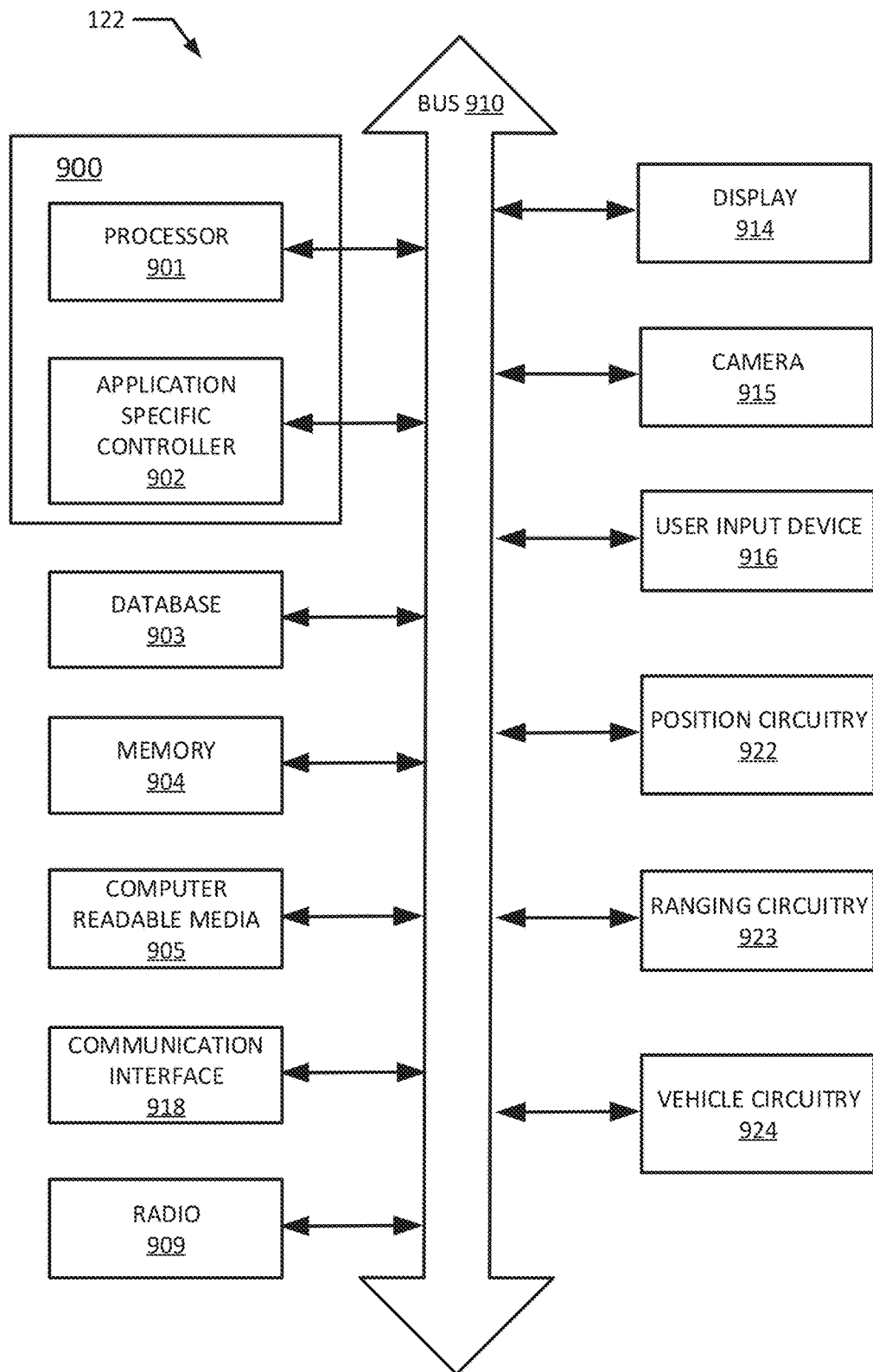
Figure 8:
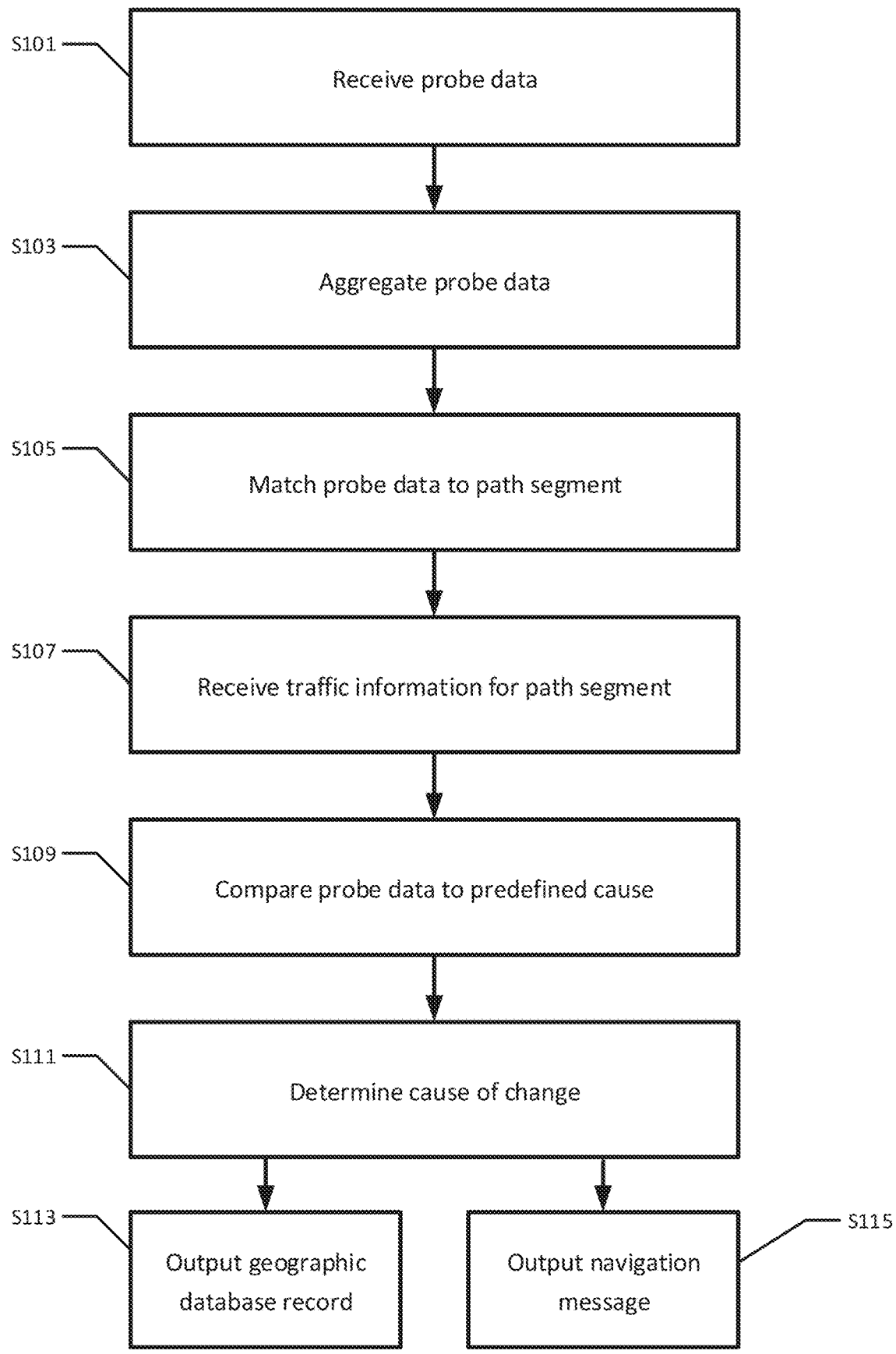
Figure 9:
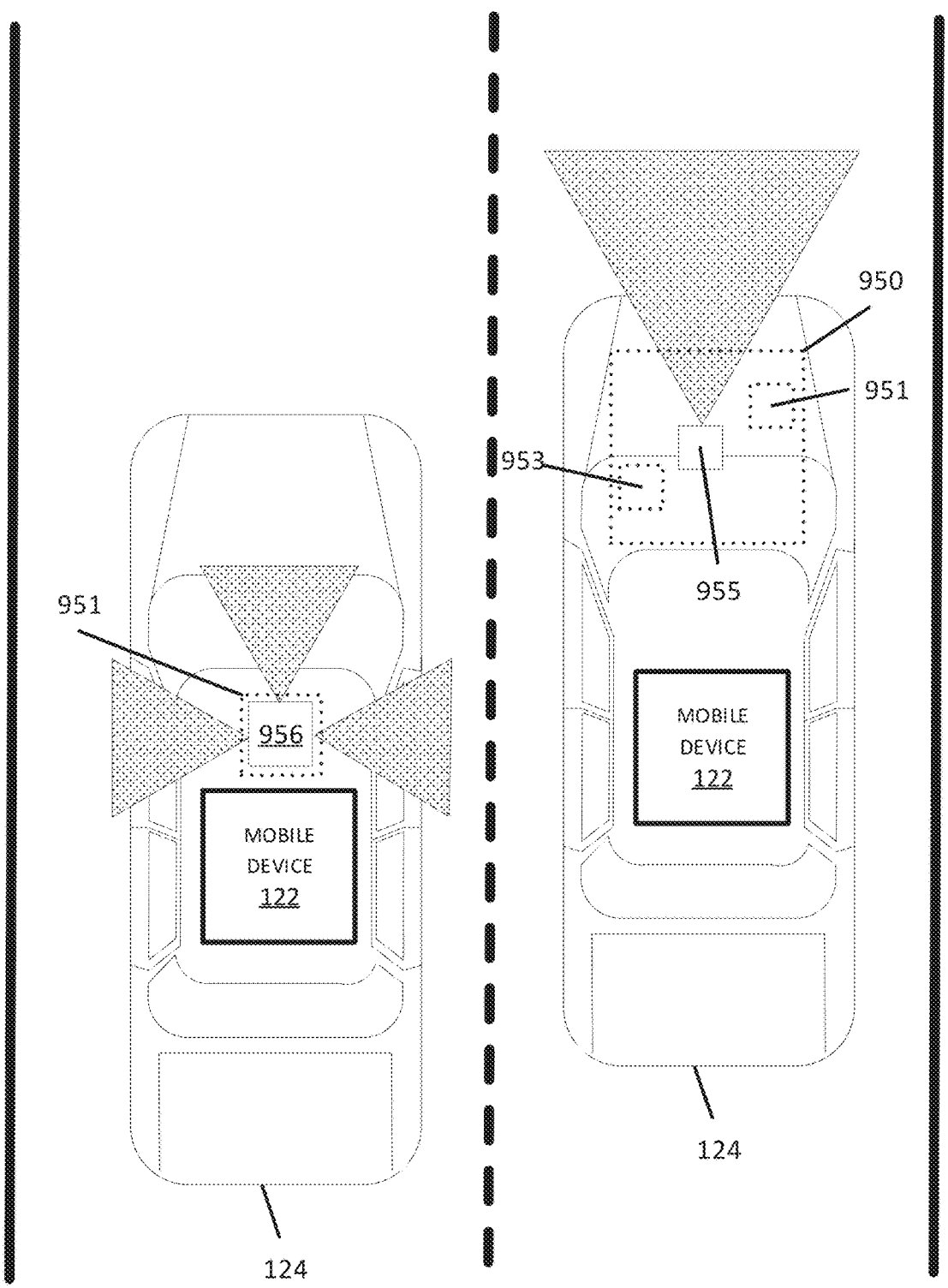
Figure 10:
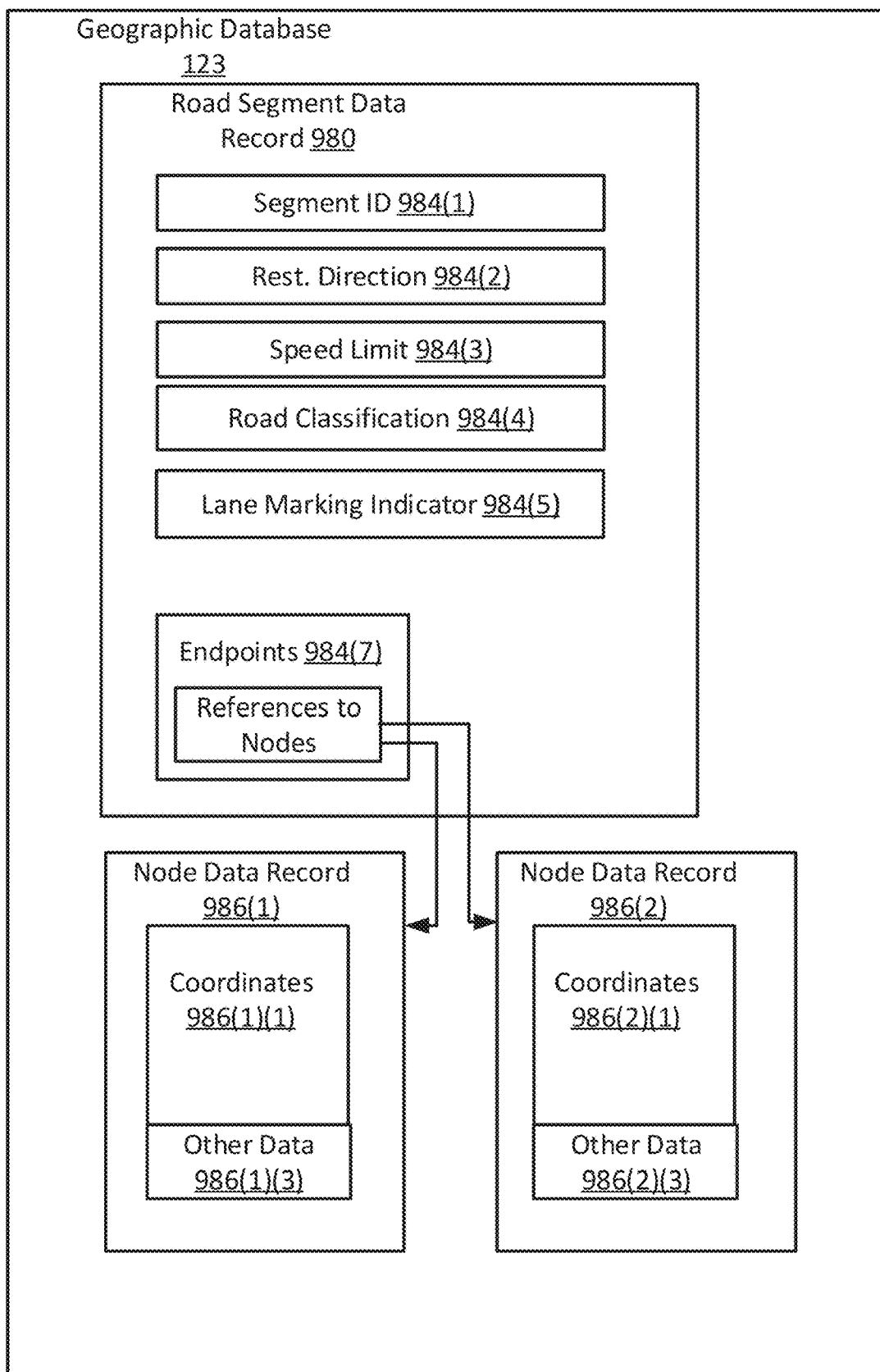
Figure 11:
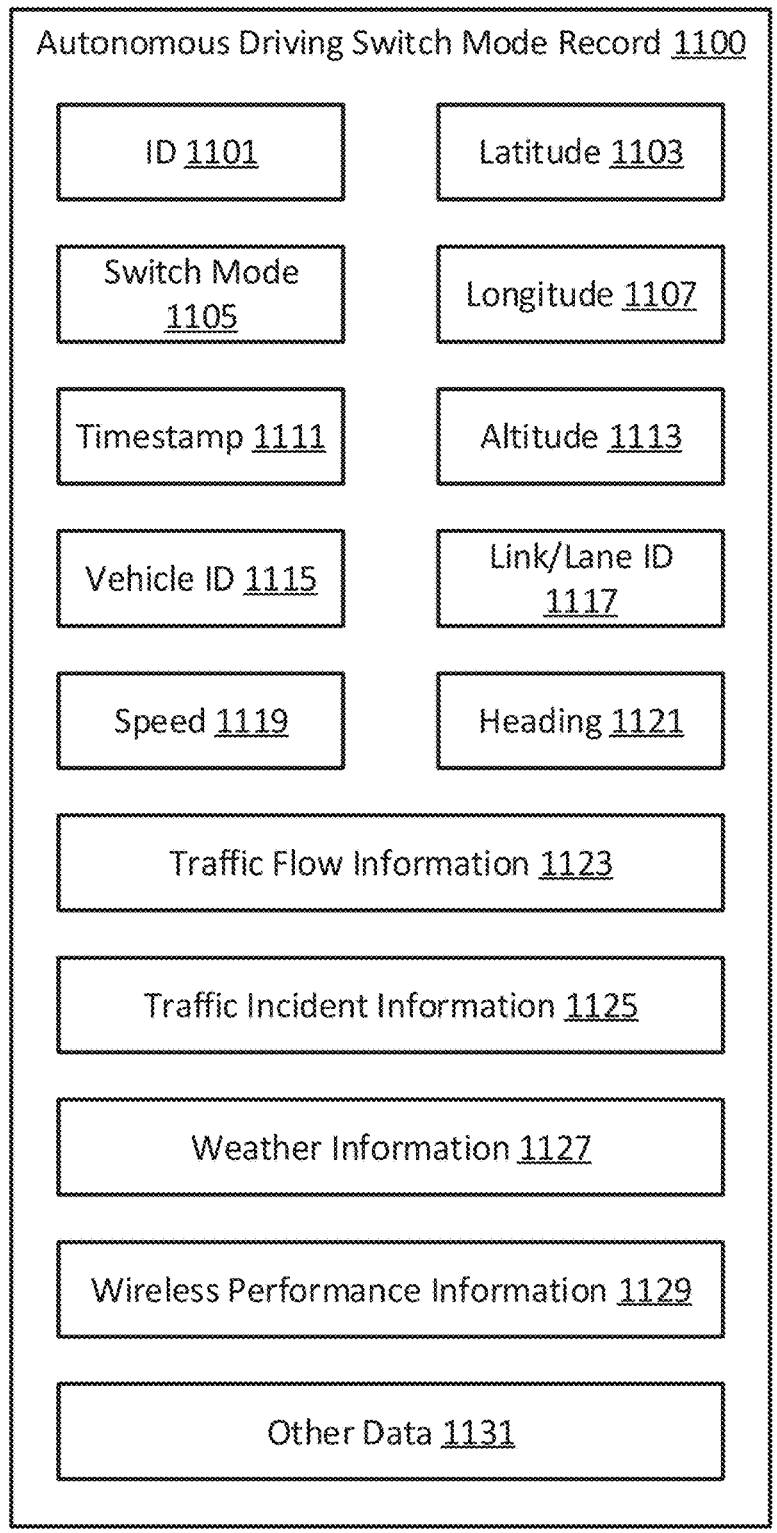

FIG. 1 illustrates a first embodiment of a system for autonomous driving.
FIG. 2 illustrates a path analyzer for the system of FIG. 1.
FIG. 3 depicts autonomous driving events.
FIG. 4 illustrates a second embodiment of a system for autonomous driving.
FIG. 5 illustrates a mobile device and navigation message.
FIG. 6 illustrates an example server for the system of FIG. 1.
FIG. 7 illustrates an example mobile device for the system of FIG. 1.
FIG. 8 illustrates an example flow chart for the server of FIG. 6.
FIG. 9 illustrates an exemplary vehicle associated with the system of FIG. 1.
FIG. 10 illustrates an exemplary database.
FIG. 11 illustrates an exemplary database record.

DETAILED DESCRIPTION

Diver assistance features aid drivers in driving and parking a vehicle. Such features may sometimes be referred to as "automated driving," "highly assisted driving," "advanced driver assistance systems," or "autonomous driving." Driver assistance features may have different levels of sophistication, ranging from simple warning to complex systems that may drive a car without user input. The driver assistance features may be enabled by an engine control management (ECM) system on a vehicle. The driver assistance features may rely on different sensor technologies and high definition (HD) map or dynamic backend content (e.g., lane level features, sometimes down to a centimeter level resolution, and 3D space maneuvers), including traffic information services, to aid the in-vehicle ECM system for the right decision strategy as how to drive along the road network.

The society of automotive engineers (SAE) sorts driver assistance features into different levels, ranging from 0 to 5.

Level 0: An automated system may issue warnings and may momentarily intervene, but has no sustained vehicle control.

Level 1: The driver and the automated system share control of the vehicle. Examples of level 1 include adaptive cruise control (ACC), where the driver controls steering and the automated system controls speed, and parking assistance, where steering is automated while speed is manual. Level 1 may be referred to as "hands off" because the driver should be prepared to retake full control of the vehicle at any time. Lane keeping assistance (LKA) Type II is a further example of level 1 driver assistance.

Level 2: The automated system takes full control of the vehicle (accelerating, braking, and steering). The driver must monitor the driving and be prepared to intervene immediately at any time if the automated system fails to respond properly. Though level 2 driver assistance may be referred to as "hands off" because the automated system has full control of acceleration braking and steering, in some cases, contact between hand and steering wheel is often required to confirm that the driver is ready to intervene. In this way, the driver supervises the actions of the driver assistance features.

Level 3: The driver can safely turn their attention away from the driving tasks, e.g., the driver can text or watch a movie. Level 3 may be referred to as "eyes off." The vehicle may handle situations that call for an immediate response, such as emergency braking. The driver should still be prepared to intervene within some limited period of time, often specified by the manufacturer, when called upon by the vehicle to do so. The car has a so-called "traffic jam pilot" that, when activated by a human driver, allows the car to take full control of all aspects of driving in slow-moving traffic at up to 60 kilometers per hour (37 miles per hour). However, the function works only on highways with a physical barrier separating one stream of traffic from oncoming traffic.

Level 4: Similar automated control as in level 3, but no driver attention is required for safety. For example, the driver may safely go to sleep or leave the driver's seat. Level 4 may be referred to as "mind off" or "driverless." Self-driving in level 4 may be supported only in limited spatial areas (e.g., within geofenced areas) or under special circumstances, like traffic jams. Outside of these areas or circumstances, the vehicle may safely abort the trip (e.g., park the car or pull over) if the driver does not retake control.

Level 5: No human intervention is required to drive the vehicle. As a result, a vehicle with level 5 driver assistance features may not require or have a steering wheel installed. An example would be a robotic taxi. Level 5 driver assistance may be referred to as "autonomous driving" because the vehicle may drive on a road without human intervention. In many cases, it is used as the same term as a driverless car, or a robotic car.

Greater numbers of vehicles with driver assistance features may make roadways safer, given advanced environment sensing capabilities, development of machine learning models over different kind of sensor technologies (e.g., camera, radar, light detection and ranging (LIDAR)), vehicle to vehicle communications, and vehicle to infrastructure communication.

Driver assistance features may be disabled based on weather changes, misalignment between the location environmental information and HD map contents, road geometry, traffic conditions, wireless network performance, road conditions, and events (such as strikes, sports events, music festivals, civil emergencies).

Driver assistance features may be enabled or disabled based on weather around a mobile device or a vehicle. For example, inclement weather such as rain, snow, fog, dust, or smoke may impair sensors. LIDAR sensors may not be able to gather accurate ranging data under such conditions. Additionally, extreme heat or cold may affect the sensors. Sensors may fail when exposed to temperatures outside of the operating range of the sensors.

When location sensors report a location misaligned with map contents, autonomous driving features may be disabled. For example, map features, such as lane position, speed limit, and signage may contradict measurements from sensors. As a result of this contradiction, driver assistance features may be disabled.

Road geometry may affect the availability of driver assistance features. For example, a rough road (e.g., from grading, pot holes, gravel, or other debris) may impair vehicle sensors, such as LIDAR, radar, or other sensors. As a result of the impaired sensors filing or providing inaccurate measurements, driver assistance features may be disabled.

Road conditions may affect available driver assistance features. For example, driver assistance features may be disabled in areas of road construction. Construction may temporality reroute traffic into different lanes or paths, completely block paths. Where such detours or blockages are not present in map content, driver assistance features may be disabled so a driver may manually navigate around such obstacles.

Traffic conditions may indicate the density and/or speed of vehicles on a path segment. In some cases, the traffic conditions may include a number of vehicles on the path having driver assistance features.

Driver assistance features may be supported by low-latency, high capacity, high bandwidth throughput, and high coverage wireless networks, like 5G networks. Some driver assistance features require extensive data processing, as well as frequent communication between a backend server and one or more vehicles. Gaps in wireless network coverage and performance may hinder some driver assistance features. For example, a set or level of driver assistance features may require a minimum wireless network connection performance (e.g., speed, bandwidth, or network generation/type). If a vehicle is driving using the set of driver assistance features and the available wireless network performance falls below the minimum, the vehicle may either switchover to a different set of driver assistance features with a lower wireless network performance requirement, or may abort the trip (e.g., by parking the vehicle), at least until the available wireless network performance is restored.

Just as one or more of the above conditions may cause driver assistance features to be disabled, driver assistance features may be enabled once the condition passes. For example, driver assistance features may be enabled when inclement weather clears, when the map is aligned with the vehicle location, when favorable road geometry or conditions are encountered, when traffic clears, or when wireless network performance improves.

To increase safety, routes may be planned that have or enable a high level of driver assistance features. For example, where driver assistance features are often disabled along a path segment, vehicle routes may be planned that avoid that path segment to increase the available driver assistance features.

By observing when and where disablement or re-enablement of driver assistance features occurs, for example, by collecting probe data from vehicles, the causes of the change in available driver assistance features may be determined. While there may be a usual or historical number of driver assistance switchovers for a path segment (e.g., 100 changes in available driver assistance features per day), a sudden increase in a number of switchovers for the path segment may indicate a problem on the path segment. In this way, a geographic database may be updated based on the problem causing the switchover. Routes planned using the database may avoid routes passing through the path segment, and existing routes may be updated to avoid the path segment.

FIG. 1 illustrates an example system for autonomous driving including a mobile device 122, a server 125, and a network 127. Additional, different, or fewer components may be included in the system. The following embodiments may be entirely or substantially performed at the server 125, or the following embodiments may be entirely or substantially performed at the mobile device 122. In some examples, some aspects are performed at the mobile device 122 and other aspects are performed at the server 125.

The mobile device 122 may include a probe 101 or position circuitry such as one or more processors or circuits for generating probe data. The probe points are based on sequences of sensor measurements of the probe devices collected in the geographic region. The probe data may be generated by receiving GNSS signals and comparing the GNSS signals to a clock to determine the absolute or relative position of the mobile device 122. The probe data may be generated by receiving radio signals or wireless signals (e.g., cellular signals, the family of protocols known as WIFI or IEEE 802.11, the family of protocols known as Bluetooth, or another protocol) and comparing the signals to a pre-stored pattern of signals (e.g., radio map). The mobile device 122 may act as the probe 101 for determining the position or the mobile device 122 and the probe 101 may be separate devices.

The probe data may include a geographic location such as a longitude value and a latitude value. In addition, the probe data may include a height or altitude. The probe data may be collected over time and include timestamps. In some examples, the probe data is collected at a predetermined time interval (e.g., every second, every 100 milliseconds, or another interval). In this case, there are additional fields like speed and heading based on the movement (i.e., the probe reports location information when the probe 101 moves a threshold distance). The predetermined time interval for generating the probe data may be specified by an application or by the user. The interval for providing the probe data from the mobile device 122 to the server 125 may be the same or different than the interval for collecting the probe data. The interval may be specified by an application or by the user. In some other cases, the probe data is collected dynamically or at different rates. For example, the rate at which the probe data is received may vary based on a trajectory or dynamic behavior of a vehicle or mobile device 122 (e.g., whether the mobile device 122 is travelling at one speed or accelerating/decelerating), a complexity of a path travelled by the mobile device 122 currently or in the future (e.g., whether the mobile device 122 is approaching an intersection, offramp, roundabout), or traffic conditions (e.g., accumulation or dissipation of traffic congestion).

A communications interface 102 may establish, manage, and/or facilitate a wireless connection between the mobile device 122 and the network 127. The communications interface 102 may connect to a network 127 using the 5G standard. In some cases, the communications interface 102 may be able to connect with other standards (e.g., 4G, 3G, 2G) when 5G networks are unavailable. Additionally or alternatively, the communications interface 102 may generate and/or output measures of the performance of the network 127. For example, the communications interface 102 may measure a current or historical speed (download/upload), bandwidth (download/upload), latency, or other performance data of the connection to the network 127. The communications interface 102 may send data from the probe 101 and/or data from the sensor 950 (e.g., sensor data 205) to the server 125 or the path analyzer 121.

Communication between the mobile device 122 and the server 125 through the network 127 may use a variety of types of wireless networks. For example, the network 127 may be a cellular network. The cellular technologies may be analog advanced mobile phone system (AMPS), the global system for mobile communication (GSM), third generation partnership project (3GPP), code division multiple access (CDMA), personal handy-phone system (PHS), and 4G or long-term evolution (LTE) standards, 5G, DSRC (dedicated short-range communication), or another protocol.

A sensor array 950 may measure one or more elements of the environment of the mobile device 122. The sensor array 950 may produce sensor data 205. The sensor array 950 may be part of or in communication with the mobile device 122. In some cases, the sensor array 950 may include one or more sensors. For example, one sensor of the sensor array 950 may be part of the mobile device, and another sensor of the array 950 may be part of a vehicle 124, such as the vehicle 124 of FIG. 8. The sensor array 950 may include multiple sensors. Example sensors include an optical distance system such as LIDAR 956, an image capture system 955 such as a camera, a sound distance system such as sound navigation and ranging (SONAR), a radio distancing system such as radio detection and ranging (RADAR), a vibration sensor, or another sensor. The camera may be a visible spectrum camera, an infrared camera, an ultraviolet camera, or another camera. In some cases, the sensor array may include an engine sensor 951. The engine sensor 951 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 953, may include a steering wheel angle sensor, a speedometer sensor, or a tachometer sensor.

FIG. 2 illustrates an example path analyzer for the system of FIG. 1. While FIG. 1 illustrates the path analyzer 121 at the server 125, the mobile device 122 may additionally or alternatively implement the path analyzer 121. In some cases, elements of the path analyzer 121 may be shared or divided between the server 125 and the mobile device 122. Additional, different, or fewer components may be included.

The path analyzer 121 may include a machine learned classifier 211 (sometimes referred to as a machine learnt classifier), a probe data aggregator 213, and a database manager 215. In some cases, the path analyzer may include a navigation controller 219. In some other cases, the navigation controller 219 may be separate from the path analyzer 121 or path of another component. Other computer architecture arrangements for the path analyzer 121 may be used. The path analyzer 121 receives data from one or more sources. The data sources may include traffic information data 201, probe data 203, and sensor data 205, but additional data sources are discussed in other embodiments. In some cases, the probe data 203 may include data from the sensor 950 of the mobile device. In some other cases, data from the sensor 950 may be received separately from the probe data 203.

The traffic information data 201 may include data regarding traffic flow, traffic speed, traffic density, traffic incidents (closed lanes, stopped vehicles, accidents, etc.) or other information for a path segment. The traffic information 201 may be dynamically updated. For example, new or updated traffic information 201 may be received on a regular or changing interval. The traffic information 201 may be received from a traffic service provider.

The probe data 203 may be generated by the probe 101. The probe data 203 may include any type of position information and may be determined by the mobile device 122 and stored by the mobile device 122. In some cases, the probe data 203 may be collected or received in response to collection of the sensor data 205. For example, when the network performance data 203 is measured or collected, probe data associated with the network performance data 203 may also be collected or measured. In other cases, the probe data 203 may be collected or received separately or independently from the network performance data. For example, the probe data 203 may be collected periodically or at a first interval, while the sensor data 205 is collected at a different interval or at other times. The probe data 203 may include geographic coordinates, a heading, and/or a speed.

In some cases, the probe data 203 may include a current set of driver assistance features enabled, or the occurrence a switchover from one set of features to another.

The probe data 203 and the sensor data 205 may be combined. For example, sensor data 205 of the sensor array 950 may be annotated with probe data 203. The mobile device 122 may be configured to generate combined data using the probe data 203 collected by the probe 101 and the sensor data 205 generated by the sensory array 950.

The probe data 203 may include network performance data, such as information about the wireless network 127 that the mobile device 122 is connected to. The sensor data 205 may include data about (or measurements of) speed, bandwidth, or network generation/type. The network performance data may be generated by the communications interface 102.

The sensor data 205 may be generated by the sensor array 950 of the mobile device 122. The sensor data 205 may include data generated by one or more sensors of the sensor array 950. For example, the sensor data 205 may include data from an optical distance system such as LIDAR 956, an image capture system 955 such as a camera, a sound distance system such as sound navigation and ranging (SONAR), a radio distancing system such as radio detection and ranging (RADAR), a vibration sensor, or another sensor.

The traffic information 201, probe data 203 and/or the sensor data 205 may be collected at a particular frequency. Examples for the particular frequency may be 1 sample per second (1 Hz) or greater (more frequent). The sampling frequency for either the probe data 203 and the sensor data 205 may be selected based on the sampling frequency available for the other of the probe data 203 and the sensor data 205. The path analyzer 121 is configured to down-sample (e.g., omit samples or average samples) in order to equalize the sampling frequency of the probe data 203 with the sampling frequency of the sensor data 205, or vice versa. In some cases, the frequency that the probe data 203 and the sensor data 205 are collected may vary. For example, the rate at which the probe data 203 is received may vary based on a trajectory or dynamic behavior of the mobile device 122 (e.g., whether the mobile device 122 is travelling at one speed or accelerating or decelerating), a complexity of a path travelled by the mobile device 122 currently or in the future (e.g., whether the mobile device 122 is approaching an intersection, offramp, roundabout), or traffic conditions (e.g., accumulation or dissipation of traffic congestion).

The path analyzer 121 may include a machine learned classifier 211, a probe data aggregator 213, and a database manager 215. The path analyzer 121 is configured to receive the traffic information 201, the probe data 203, and the sensor data 205. The path analyzer 121 may receive the data 201, 203 from one or more mobile devices 122.

In some cases, the probe data 203 and sensor data 205 may be associated with one or more path segments. Based on a location in the probe data 203 or sensor data 205, the path analyzer 121 may match the location to a path segment. The path segment may be included in map data 206 received from a geographic database, such as database 123. The traffic information 201 may include information for the path segment matched to the probe data 203.

The path analyzer 121 may be configured to determine a cause of the switchover based on the traffic information 201, probe data 203, and/or sensor data 205. In some cases, the cause may be determined by applying the data to a machine learned classifier 211. In some other cases, the cause may be determined by applying a statistical tool to the data, such as a predefined pattern. The predefined pattern may include one or more definitions of potential causes of switchovers. For example, the pattern may include definitions of inclement weather, congestion levels, wireless performance thresholds, complex road geometry, or traffic incidents that are potential causes of switchovers. The definitions may include threshold amounts for the data to match the definition. For example, the inclement weather definition may include numerical ranges of wind speed and/or rainfall that may cause switchovers. In another example, the congestion level definition includes a range of speed or vehicle density that may cause switchovers. In another example, the wireless performance definition may include a wireless performance threshold (e.g., latency, speed, bandwidth, or signal strength) that may result in switchovers when not met. In still a further example, the road geometry definition may include ranges of road measurements (such as measurements of a turn radius, number of lanes at an intersection or ramp, or lane deviation) which may cause switchovers. By comparing the pattern to the received data (including traffic information 201, probe data 203, and/or sensor data 205), definitions in the pattern that match the data may be potential causes of the switchover.

In some other cases, the cause of the switchovers may be determined by a machine learned classifier 211. The traffic information 201, probe data 203, and/or sensor data 205 may be applied (e.g., by the path analyzer 121) as in input to the machine learned classifier 211. The classifier 211 may be configured to, based on the input data, output a cause (e.g., the cause 217) of the switchover. The machine learned classifier 211 may have been trained on a training set of traffic information 201, probe data 203, and/or sensor data 205 and associated causes. Based on the training, the machine learned classifier may output a cause based on new input data (e.g., traffic information 201, probe data 203, and/or sensor data 205) not part of the training set. In this way, the cause of the switchover may be determined by the path analyzer 121 based on applying the received data to the machine learned classifier 211.

The probe data aggregator 213 may be configured to combine or filter the traffic information 201, probe data 203, and/or sensor data 205 received from or related to one or mobile devices 122. The probe data aggregator may retain probe data 203 from multiple vehicles within a particular area or within a particular time period. Probe data 203 that is filtered out by the aggregator 213 may not be aggregated. Additionally or alternatively, the probe data aggregator 213 may add, average, or perform another operation on the received data. In some cases, the aggregator 213 may group received data based on a time period, for example, per minute, hour, day, or another period of time. By aggregating data from multiple mobile devices 122 (in some cases, hundreds or thousands of mobile devices 122), local trends in switchovers or other conditions may be compared to historical patterns for a path segment. In this way, the path analyzer may compare a switchover rate for a path segment aggregated from mobile devices over an hour to historical trends for the per hour switchover rate for the path segment. The path analyzer 121 may input the aggregated traffic information 201, probe data 203, and/or sensor data 205 from multiple vehicles to the machine learned classifier 211.

The database manager 215 may be configured to output a database record 223. The database record 223 may include the traffic information 201, probe data 203, and/or sensor data 205 along with a determined cause of the switchover. The database record 223 may be output to update a geographic database, such as the database 123. The database record 223 is shown in greater detail in FIG. 11.

The cause 217 of one or more switchovers may be determined by the path analyzer 121, for example, using the machine learned classifier 211 or predefined pattern. The cause 217 may be included in the database record 223. Additionally or alternatively, the cause 217 may be send to and/or received by the navigation controller 219. The cause

217 may form the basis of a navigation message 221, such as a vehicle route, autonomous driving command, or an alert.

The navigation controller 219 may be configured to output a navigation message 221. The navigation message 221 may be based on the cause 217. For example, based on the cause 217, the navigation controller 219 may update a vehicle route via the navigation message 219. The updated vehicle route may avoid the path segment where the switchover occurred according to the cause. In another example, the navigation message 221 may include a warning. For example, a mobile device 122 or a vehicle may be approaching a path segment or may have a route planned including the path segment where the switchover occurred. The navigation message 221 may include an alert or message presenting the cause. The navigation message 221 may include a notification of the cause (e.g., "lane closed" or "pothole ahead") or of the possibility of driver assistance features being disabled. In a further example, the navigation message 221 may include instructions to disable a driver assistance feature based on the cause. Rather than the driver assistance features being disabled when the cause of the switchover occurs (e.g., when a vehicle reaches the closed lane, pothole, or other cause), the driver assistance features may be disabled in advance so that a driver is in control of the mobile device 122 or vehicle prior to the location of the switchover.

FIG. 3 depicts autonomous driving events. Switchovers, or changes or in available driver assistance features, may be collected or received for one or more path segments. The switchovers may be collected in probe data 203 from a mobile device 122. The collected changes may be plotted in a histogram 300. Bars 302 (corresponding to mode 1 switchovers) and 304 (corresponding to mode 2 switchovers) on the histogram 300 indicate a number of changes for a mode. Mode 1 switchovers 302 may indicate that one or more driver assistance features are disabled (e.g., switching from an autonomous driving mode to manual control over a path segment). Mode 2 switchovers 304 may indicate that one or more driver assistance features are re-enabled (e.g., switching from manual control to an autonomous driving mode over a path segment). The switchovers may be plotted for each path segment, marked by a path segment identifier 310. Each path segment 310 may represent switchover data collected for a specific link or lane. For example, on path segment "F1025325421" there are 50 mode 1 switchovers and 2 mode 2 switchovers.

The histogram 300 shows switchovers for a time period. For example, switchovers may be collected and displayed for an hour, a day, or for another time period. The histogram 300 may be used to examine recent trends in switchover rates for a path segment 310 and compare the rates to historical trends (e.g., stored in a geographic or map database) for the path segment 310. In some cases, the number of switchovers on a path segment 310 for a time period may be normalized by a number of vehicles traversing the path segment 310 that have driver assistance features. For example, the number of vehicles traversing the path segment may be present in the traffic information 201. In some cases, a ratio may be defined by dividing the number of switchovers by the number of vehicles. Dividing by the number of vehicles normalizes the switchover rate so that an increase in traffic (with a proportional increase in switchovers) does not increase the ratio. A short-term ratio (e.g., determined using switchover and vehicle data from an hour, a day, a week) may be compared to a historical ratio (e.g., determined using data from a month, a quarter, a year, or any length of time longer than the short-term ratio). Where the short-term ratio differs from the historical ratio by more than a threshold amount, it may be determined that an event on the path segment is causing the mode 1 or mode 2 switchovers. In this way, an individual switchover may not be analyzed until a significant number switchovers occur beyond historical trends. By analyzing statistically significant numbers of switchovers, analyzing the switchovers may be performed more efficiently or using fewer computational resources.

FIG. 4 illustrates a second embodiment of a system 400 for autonomous driving. An analytic system 401 receives sensor data 205 and probe data 203 from a mobile device 122. The analytic system may also receive incident data 201, wireless network performance data 403, weather data 405, and map data 206. In some cases, the wireless network performance data 403 may be received from the mobile device 122. For example, the wireless network performance data may be a part of or separate from the probe data 203 or sensor data 203 received from the mobile device 122. In some other cases, the wireless network performance data 403 may be received from a wireless network survey, from a geographic database 123, or from another source. The weather data 405 may, in some cases, be part of the traffic information 201. The analytic system 401 may be the path analyzer 121, the analytic system 401 may be a component of the path analyzer 121, or the path analyzer 401 may be a component of the analytic system 401.

When the received data 201, 203, 205, 403, 405, and/or 206 indicates that driver assistance features have been enabled or disabled for a vehicle traversing a path segment (a "switchover"), the system 401 may match the switchover event to a path in the map data 206. For example, the map data 206 and/or received data 201, 203, 205, 403, and 405 corresponding to a similar time or geographic area as the switchover may be retrieved to provide context to the switchover event. Based on the map-matched switchover and corresponding data 201, 203, 205, 403, 405, and/or 206, the system 401 may determine a cause of the switchover.

The cause of the switchover may be sent to a mobile device 122. For example, the cause of the switchover may be sent via a navigation message to a mobile device 122. In this way, the cause of a switchover of one or more vehicles may be shared with other vehicles. By way of the cause transmitted to the mobile devices 122, other vehicle may warn users of upcoming switchovers on a path segment, or may reroute vehicles to avoid the path segment.

Additionally or alternatively, the cause may be sent to an entity 407, such as a geographic database 123, an agency covering the path segment or planning paths, wireless network provider, or vehicle or mobile device manufacturer. In some cases, the system 401 may combine the cause and the received data 201, 203, 205, 403, 405, and/or 206 into a database record. The database record may update the geographic database 123. By updating, the condition of the path segment (e.g., as affected by the cause of the switchover) may be used to plan vehicle routes. For example, the path segment causing the switchovers may be avoided in vehicle routes planed based on the geographic database 123. Reporting the cause increases vehicle safety by ensuring the real conditions of the path segment match the contents of the map data and other data available to the mobile device 122.

FIG. 5 illustrates an example mobile device 122 and navigation message 502. An example message environment 500 may include the mobile device 122 integrated with or in communication with a vehicle 124, the navigation message 502, a user control device 504.

The navigation message 502 may be generated and/or sent by the path analyzer 121 and/or the analytic system 401. The message 502 may be received by the mobile device 122 via the network 127 or a wireless radio network. Parts of the navigation message 502 may be visible to the user while other parts of the navigation message 502 are not visible to the user. For example, the message 502 may include text displayed to the user via the mobile device 122. The message 502 may include other information, such as an updated vehicle route 506, updated map contents (e.g., including the condition of the path segment where the switchover occurred), or an instruction for the operation of the vehicle 124. The other information may not be visible to the user, for example, as the other information configures the driver assistance features, a controller, or another element of the mobile device 122 or the vehicle 124.

The message 502 may contain the cause or text generated based on the cause. In some cases, the navigation message 502 may indicate that driver assistance features may be enabled or disabled on the path segment. For example, the navigation message 502 may display a warning, such as "Alert: approaching to region or road with autonomous driving risks."

The user control device 504 may receive user input to operate the vehicle. The user control device 504 may be a steering wheel, control stick, button, or another device. When driver assistance features are disabled, the user may take control of the vehicle 124 via the control device 504. When driver assistance features are re-enabled, in some cases, user input via the control device 504 may be unnecessary, not required, or optional for operation of the vehicle 124.

A vehicle route 506 may be displayed on the mobile device 122. The navigation message 502 may annotate the route 506. For example, the navigation message 502 may preview, highlight, or otherwise indicate the patch segment over which the switchover occurred or a location of the cause along the route. In some cases, the vehicle route 506 may be changed based on the switchover. The navigation message 502 may indicate the new route 506 or that the route 506 has changed.

FIG. 6 illustrates an example server 125 for the system of FIG. 1. The server 125 may include a bus 810 that facilitates communication between a controller (e.g., the path analyzer 121) that may be implemented by a processor 801 and/or an application specific controller 802, which may be referred to individually or collectively as controller 800, and one or more other components including a database 803, a memory 804, a computer readable medium 805, a display 814, a user input device 816, and a communication interface 818 connected to the internet and/or other networks 820. The contents of database 803 are described with respect to database 123. The server-side database 803 may be a master database that provides data in portions to the database 903 of the mobile device 122. Additional, different, or fewer components may be included.

The memory 804 and/or the computer readable medium 805 may include a set of instructions that can be executed to cause the server 125 to perform any one or more of the methods or computer-based functions disclosed herein. In a networked deployment, the system of FIG. 6 may alternatively operate or as a client user computer in a client-server user network environment, or as a peer computer system in a peer-to-peer (or distributed) network environment. It can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. While a single computer system is illustrated, the term "system" shall also be taken to include any collection of systems or sub-systems that individually or jointly execute a set, or multiple sets, of instructions to perform one or more computer functions.

The server 125 may be in communication through the network 820 with a content provider server 821 and/or a service provider server 831. The server 125 may provide the point cloud to the content provider server 821 and/or the service provider server 831. The content provider may include device manufacturers that provide location-based services associated with different locations POIs that users may access.

FIG. 7 illustrates an example mobile device 122 for the system of FIG. 1. The mobile device 122 may include a bus 910 that facilitates communication between a controller (e.g., the path analyzer 121) that may be implemented by a processor 901 and/or an application specific controller 902, which may be referred to individually or collectively as controller 900, and one or more other components including a database 903, a memory 904, a computer readable medium 905, a communication interface 918, a radio 909, a display 914, a camera 915, a user input device 916, position circuitry 922, ranging circuitry 923, and vehicle circuitry 924. The contents of the database 903 are described with respect to database 123. The device-side database 903 may be a user database that receives data in portions from the database 903 of the mobile device 122. The communication interface 918 connected to the internet and/or other networks (e.g., network 820 shown in FIG. 6). The vehicle circuitry 924 may include any of the circuitry and/or devices described with respect to FIG. 7. Additional, different, or fewer components may be included.

FIG. 8 illustrates an example flow chart for the server of FIG. 6. Additional, different, or fewer acts may be included. For example, act S101, S103, and/or act S107 may be omitted. The acts may be performed in a different order than shown. For example, act S107 may proceed from act S109.

In act S101, probe data 203 is received. The probe data 203 may be received from one or more vehicles 122. A path analyzer 121 or analytic system 401 may receive the probe data 203. The probe data 203 may indicate that available driver assistance features have changed. In a "switchover," one or more driver assistance features are disabled or are unavailable, or one or more driver assistance features (e.g., features that were previously disabled) are enabled or made available to operate the vehicle 124. The probe data 203 may include a location, speed, or heading of the mobile device or performance data 403 relating to a wireless network (such as latency, bandwidth, speed, or signal strength). Sensor data 205 may be received together with or separately from the probe data 203. The sensor data 205 may include information generated by one or more sensors, such as an optical distance system such as LIDAR 956, an image capture system 955 such as a camera, a sound distance system such as sound navigation and ranging (SONAR), a radio distancing system such as radio detection and ranging (RADAR), a vibration sensor, or another sensor. Other information may be received. As shown in FIG. 4, traffic information 201, weather 405, and map data 206 may be received.

In act S103, probe data 203 is aggregated. Probe data 203 may be received from multiple vehicles in act S101. The probe data 203 may be combined or filtered by the probe data aggregator 213. Probe data 203 within a predefined time period or area may be retained while probe data 203 outside of the time period or area may be excluded from aggregation. Addition, averaging, or other operations may be performed to the probe data. For example, the probe data may be normalized by a number of vehicles with driver assistance features traversing the path segment where the switchover occurs.

While a single switchover may not indicate a condition of the path segment causing the switchover (because the switchover may be caused by a malfunction of the mobile device 122 or the vehicle 124), multiple switchovers aggregated from multiple mobile devices 122 may more strongly suggest that the path segment is causing the switchovers.

To determine whether the number of switchovers in the probe data 203 is significant, the switchovers may be compared to historical trends, as illustrated in FIG. 3. Where switchovers for a path segment are beyond historical norms for the path segment, a condition of the path segment may be causing the switchovers.

In act S105, probe data 203 (or aggregated probe data 203) is matched to a path segment. In one example, the path segment may be identified in the map data 206. To match the probe data 203 to a path segment, a location of the probe data may be compared to a location of the path segment. By matching the probe data 203 to a path segment, other information about the matched path segment may be obtained.

In act S107, traffic information 201 for a path segment is received. Traffic information 201 may be received from a database, such as the geographic database 123. A path analyzer 121 or analytic system 401 may receive the traffic information 201. The traffic information 201 may relate to the path segment to which the probe data 203 was matched. Incident information, such as the presence of traffic accidents, disabled vehicles, construction, emergency vehicles, or other events may be included in the traffic information 201. The traffic information 201 may provide additional context for the probe data 203. By obtaining additional information about the conditions of the path segment, a cause of the switchovers may be determined based on the conditions.

In act S109, the probe data 203 is compared to a predefined pattern. The pattern is a statistical tool that may include definitions of potential causes of the switchover. The definitions may include levels, thresholds, or ranges of conditions that may cause switchovers and may coordinate with the types of information collected indicating conditions of the path segment. For example, the definitions may specify potential causes such as vehicle accident, road geometry or curvature, road construction, inclement weather, wireless network performance, or changes in signage that may be present in the probe data, sensor data, traffic information, map data, or other sources collected for the path segment.

In act S111, a cause of a change in available driver assistance features is determined. For example, when the information collected for the path segment matches the predefined pattern, the cause of the switchover may be determined based on the pattern. Additionally or alternatively, the switchover cause may be determined by a machine learned classifier (sometimes referred to as a machine learnt classifier). The data collected for the path segment (including the probe data, sensor data, traffic information, and map data) may be applied to the machine learned classifier. The machine learned classifier may be configured to output a cause of the switchovers based on the input.

In act S113, a database record 223 is output. The database manager 215 may generate the database record 223. The database record 223 may be generated based on the data collected for the path segment. For example, the database record 223 may include one or more items, such as a record identifier, a location (latitude, longitude, altitude, heading) of the mobile device 122, a speed of the mobile device 122, a switch mode (e.g., mode 1 or mode 2 as described in FIG. 3), a timestamp of the switchover, a vehicle 124 or mobile device 122 identifier, and/or a path segment identifier. Additionally, contextual information about the switchover may be included in the database record 223, such as traffic flow information, traffic incident information, weather information, wireless network performance information, and other data. The database record 223 may also identify which of the information in the record may have caused the switchover. The database record 223 may be output to a geographic database 123. In this way, the switchover may be used to identify additional switchovers with similar conditions. The database record is shown in more detail in FIG. 11.

In act S115, a navigation message 221 is output. The navigation controller 219 may generate and output the navigation message 221. The contents of the navigation message 221 may be based on the cause of the switchover. The navigation message 221 may include an alert or warning to a user of the mobile device 122 that a condition of the path segment may cause a switchover. For example, the navigation message 221 may identify the cause of the switchover, such as a vehicle accident on the path segment, road geometry/curvature, road construction, inclement weather, poor wireless network performance, and/or traffic sign changes.

In some cases, the navigation message 221 may include a vehicle route. Based on the path segment, the navigation controller may generate a vehicle path. For example, a vehicle path may avoid the path segment where the switchover occurred. In another example, the navigation message 221 may update an exiting vehicle path of the mobile device 122 to reroute the mobile device 122 around the location of the switchover.

FIG. 9 illustrates an exemplary vehicle 124 associated with the system of FIG. 1 for providing location-based services or application using the point clouds described herein as well as collecting data for such services or applications and/or the generation of the point clouds described herein. The vehicles 124 may include a variety of devices that collect position data as well as other related sensor data for the surroundings of the vehicle 124. The position data may be generated by a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively or additionally, the one or more detectors or sensors may include an accelerometer built or embedded into or within the interior of the vehicle 124. The vehicle 124 may include one or more distance data detection device or sensor, such as a LIDAR device. The distance data detection sensor may generate point cloud data. The distance data detection sensor may include a laser range finder that rotates a mirror directing a laser to the surroundings or vicinity of the collection vehicle on a roadway or another collection device on any type of pathway. The distance data detection device may generate the trajectory data. Other types of pathways may be substituted for the roadway in any embodiment described herein.

A connected vehicle includes a communication device and an environment sensor array 950 for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array 950 may include one or more sensors configured to detect surroundings of the vehicle 124. The sensor array 950 may include multiple sensors. Example sensors include an optical distance system such as LIDAR 956, an image capture system 955 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera, or another camera.

In some alternatives, additional sensors may be included in the vehicle 124. An engine sensor 951 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 953, may include a steering wheel angle sensor, a speedometer sensor, or a tachometer sensor.

A mobile device 122 may be integrated in the vehicle 124, which may include assisted driving vehicles such as autonomous vehicles, highly automated driving (HAD), and advanced driver assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to routes including path segments) received from geographic database 123 and the server 125 and driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to routes including path segments received from geographic database 123 and the server 125 and driving commands or navigation commands.

A highly automated driving (HAD) vehicle may refer to a vehicle that does not completely replace the human operator. Instead, in a highly automated driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to routes including path segments received from geographic database 123 and the server 125 and driving commands or navigation commands.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the routes including path segments received from geographic database 123 and the server 125 and driving commands or navigation commands.

FIG. 10 illustrates components of a road segment data record 980 contained in the geographic database 123 according to one embodiment. The road segment data record 980 may include a segment ID 984(1) by which the data record can be identified in the geographic database 123. Each road segment data record 980 may have associated information (such as "attributes", "fields", etc.) that describes features of the represented road segment. The road segment data record 980 may include data 984(2) that indicate the restrictions, if any, on the direction of vehicular travel permitted on the represented road segment. The road segment data record 980 may include data 984(3) that indicate a speed limit or speed category (i.e., the maximum permitted vehicular speed of travel) on the represented road segment. The road segment data record 304 may also include classification data 984(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 980 (or data entities) that describe current, historical, or future driver assistance switchovers and/or the causes of the switchovers for the road segment. Additional schema may be used to describe road objects. The attribute data may be stored in relation to geographic coordinates (e.g., the latitude and longitude) of the end points of the represented road segment. In one embodiment, the data 984(7) are references to the node data records 986 that represent the nodes corresponding to the end points of the represented road segment.

The road segment data record 980 may also include or be associated with other data that refer to various other attributes of the represented road segment. The various attributes associated with a road segment may be included in a single road segment record or may be included in more than one type of record which cross-references to each other. For example, the road segment data record may include data identifying what turn restrictions exist at each of the nodes which correspond to intersections at the ends of the road portion represented by the road segment, the name, or names by which the represented road segment is identified, the street address ranges along the represented road segment, and so on.

The road segment data record 908 may also include endpoints 984(7) that reference one or more node data records 986(1) and 986(2) that may be contained in the geographic database 123. Each of the node data records 986 may have associated information (such as "attributes", "fields", etc.) that allows identification of the road segment(s) that connect to it and/or its geographic position (e.g., its latitude and longitude coordinates). The node data records 986(1) and 986(2) include the latitude and longitude coordinates 986(1)(1) and 986(2)(1) for their node, the node data records 986(1) and 986(2) may also include other data 986(1)(3) and 986(2)(3) that refer to various other attributes of the nodes. In one example, the node data records 986(1) and 986(2) include the latitude and longitude coordinates 986(1)(1) and 986(2)(1) and the other data 986(1)(3) and 986(2)(3) reference other data associated with the node.

The controller 900 may communicate with a vehicle ECU which operates one or more driving mechanisms (e.g., accelerator, brakes, steering device). Alternatively, the mobile device 122 may be the vehicle ECU, which operates the one or more driving mechanisms directly.

The controller 800 or 900 may include a routing module including an application specific module or processor that calculates routing between an origin and destination. The routing module is an example means for generating a route in response to the anonymized data to the destination. The routing command may be a driving instruction (e.g., turn left, go straight), which may be presented to a driver or passenger, or sent to an assisted driving system. The display 914 is an example means for displaying the routing command. The mobile device 122 may generate a routing instruction based on the anonymized data.

The routing instructions may be provided by display 914. The mobile device 122 may be configured to execute routing algorithms to determine an optimal or suboptimal route to travel along a road network from an origin location to a destination location in a geographic region. Using input(s) including map matching values from the server 125, a mobile device 122 examines potential routes between the origin location and the destination location to determine the optimal route. The mobile device 122, which may be referred to as a navigation device, may then provide the end user with information about the optimal route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device 122 may plan a route through a road system or modify a current route through a road system in response to the request for additional observations of the road object. For example, when the mobile device 122 determines that there are two or more alternatives for the optimal route and one of the routes passes the initial observation point, the mobile device 122 selects the alternative that passes the initial observation point. The mobile devices 122 may compare the optimal route to the closest route that passes the initial observation point. In response, the mobile device 122 may modify the optimal route to pass the initial observation point.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. In some cases, the mobile device 122 may be a drone or other piloted or non-piloted aircraft. Non-limiting embodiments of navigation devices may also include relational database service devices, mobile phone devices, car navigation devices, and navigation devices used for air or water travel.

The geographic database 123 may include map data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the map data. The map data may include structured cartographic data or pedestrian routes. The map data may include map features that describe the attributes of the roads and intersections. The map features may include geometric features, restrictions for traveling the roads or intersections, roadway features, or other characteristics of the map that affects how vehicles 124 or mobile device 122 for through a geographic area. The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle. The geographic database 123 may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, wireless network performance data, autonomous driving switch mode records, and maneuver data.

The geographic database 123 may contain at least one road segment database record 304 (also referred to as "entity" or "entry") for each road segment in a particular geographic region. The geographic database 123 may also include a node database record (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The radio 909 may be configured to radio frequency communication (e.g., generate, transit, and receive radio signals) for any of the wireless networks described herein including cellular networks, the family of protocols known as WIFI or IEEE 802.11, the family of protocols known as Bluetooth, or another protocol.

The memory 804 and/or memory 904 may be a volatile memory or a non-volatile memory. The memory 804 and/or memory 904 may include one or more of a read-only memory (ROM), random access memory (RAM), a flash memory, an electronic erasable program read only memory (EEPROM), or other type of memory. The memory 904 may be removable from the mobile device 122, such as a secure digital (SD) memory card.

The communication interface 818 and/or communication interface 918 may include any operable connection. An operable connection may be one in which signals, physical communications, and/or logical communications may be sent and/or received. An operable connection may include a physical interface, an electrical interface, and/or a data interface. The communication interface 818 and/or communication interface 918 provides for wireless and/or wired communications in any now known or later developed format.

The input device 916 may be one or more buttons, keypad, keyboard, mouse, stylus pen, trackball, rocker switch, touch pad, voice recognition circuit, or other device or component for inputting data to the mobile device 122. The input device 916 and display 914 be combined as a touch screen, which may be capacitive or resistive. The display 914 may be a liquid crystal display (LCD) panel, light emitting diode (LED) screen, thin film transistor screen, or another type of display. The output interface of the display 914 may also include audio capabilities, or speakers. In an embodiment, the input device 916 may involve a device having velocity detecting abilities.

The ranging circuitry 923 may include a LIDAR system, a RADAR system, a structured light camera system, SONAR, or any device configured to detect the range or distance to objects from the mobile device 122.

The positioning circuitry 922 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 922 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 922 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 922 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

FIG. 11 illustrates an exemplary database record 1100. The record 1100 may contain information extracted from the probe data 203, sensor data 205, traffic information 201, and map data 206. For example, the record may include data fields for a record identifier 1101, a location (latitude 1103, longitude 1107, altitude 1113, heading 1121) of the mobile device 122, a speed 1119 of the mobile device 122, a switch mode 1105 (e.g., mode 1 or mode 2 as described in FIG. 3), a timestamp 1111 of the switchover, a vehicle 124 or mobile device 122 identifier 1115, and a path segment identifier 1121. In some cases, one of the pieces of information included in the record 1100 relating to the conditions of the path segment. For example, the record 1100 may contain data fields for traffic flow information 1123, traffic incident information 1125, weather information 1127, wireless network performance information 1129, and other data 1131.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network devices.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such backend, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually, and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   receiving, by a processor, probe data generated by a probe of a vehicle, the probe data including a change in a driver assistance capability of the vehicle;
   matching, by the processor, the probe data to a path segment;
   determining, by the processor, a cause of the change in the driver assistance capability for the path segment based on the probe data matched to the path segment, wherein the change in the driver assistance capability is a disabling or enabling of an available driver assistance capability due to a condition of the path segment;
   outputting, by the processor, a geographic database record including the path segment;
   updating, by the processor, the geographic database record to include the cause of the change in the driver assistance capability for the path segment; and
   enabling or disabling, by the processor, the driver assistance capability of the vehicle driving along a route using the updated geographic database record.

2. The method of claim 1, wherein the cause of the change in the driver assistance capability is determined using a machine-learned network.

3. The method of claim 1, further comprising:
   comparing, by the processor, the probe data to a predefined pattern,
   wherein the cause of the change in the driver assistance capability is determined based on the predefined pattern compared to the probe data.

4. The method of claim 1, further comprising: outputting, by the processor, a navigation message based on the cause of the change in the driver assistance capability.

5. The method of claim 4, further comprising:
   determining, by the processor, a vehicle route based on the cause of the change in the driver assistance capability,
   wherein the navigation message includes the vehicle route.

6. The method of claim 4, wherein the navigation message includes an updated vehicle route, updated map contents having the condition of the path segment where the change in the driver assistance capability occurred, or an instruction for an operation of the vehicle.

7. The method of claim 1, wherein the probe data includes wireless network performance, and
   wherein the cause of the change in the driver assistance capability is determined based on the wireless network performance.

8. The method of claim 1, further comprising:
   receiving, by the processor, traffic information, incident information, road hazard information, weather information, or a combination thereof for the path segment,
   wherein the cause of the change in the driver assistance capability is determined based on the traffic information, the incident information, the road hazard information, the weather information, or the combination thereof.

9. A system comprising:
a probe data aggregator configured to receive probe data from a probe of each vehicle of a plurality of vehicles, the probe data including a change in a driver assistance capability of the vehicle;
a path analyzer configured to match the probe data to a path segment and determine a cause of the change in the driver assistance capability for the path segment based on the probe data matched to the path segment, wherein the change in the driver assistance capability is a disabling or enabling of an available driver assistance capability due to a condition of the path segment;
a database manager configured to output a geographic database record including the path segment and update the geographic database record to include the cause of the change in the driver assistance capability for the path segment to assist;
a controller configured to enable and disable the driver assistance capability of the vehicle driving along a route using the updated geographic database record; and
a navigation controller configured to output a navigation message instructing a driver about the change in the driver assistance capability of the vehicle driving along the route prior to the change in the driving assistance capability.

10. The system of claim 9, further comprising:
a machine-learned classifier,
wherein the path analyzer is configured to apply the probe data matched to the path segment to the machine learned classifier,
wherein the cause of the change in the driver assistance capability for the path segment is determined based on applying the probe data matched to the path segment to the machine learned classifier.

11. The system of claim 9, wherein the path analyzer is configured to compare the probe data to a predefined pattern, and
wherein the cause of the change in the driver assistance capability is determined based on the predefined pattern compared to the probe data.

12. The system of claim 9, wherein the navigation controller is configured to determine a vehicle route based on the cause of the change in the driver assistance capability, and
wherein the navigation message includes the vehicle route.

13. The system of claim 9, wherein the change in the driver assistance capability is a transition from a manual vehicle control mode to a driver assistance mode.

14. The system of claim 9, wherein the probe data aggregator is configured to receive traffic information for the path segment, and
wherein the cause of the change in the driver assistance capability is determined based on the traffic information.

15. The system of claim 9, wherein the navigation message includes an updated vehicle route, updated map contents having the condition of the path segment where the change in the driver assistance capability occurred, or an instruction for an operation of the vehicle.

16. A non-transitory computer-readable medium including instructions that when executed are operable to:
aggregate probe data generated by a probe of each vehicle of a plurality of vehicles, the probe data including a change in a driver assistance capability of each vehicle of the plurality of vehicles;
match the probe data to a path segment;
determine a cause of the change in the driver assistance capability for the path segment based on the probe data matched to the path segment, wherein the change in the driver assistance capability is a disabling or enabling of an available driver assistance capability due to a condition of the path segment;
output a geographic database record including the path segment;
update the geographic database record to include the cause of the change in the driver assistance capability for the path segment; and
enabling or disabling the driver assistance capability of the vehicle driving along a route using the updated geographic database record.

17. The non-transitory computer-readable medium of claim 16, further comprising instructions operable to:
compare the probe data to a predefined pattern,
wherein the cause of the change in the driver assistance capability is determined based on the predefined pattern compared to the probe data.

18. The non-transitory computer-readable medium of claim 16, further comprising instructions operable to output a navigation message instructing a driver about the change in the driver assistance capability of the vehicle driving along the route prior to the change in the driving assistance capability.

* * * * *